United States Patent Office

3,830,791
Patented Aug. 20, 1974

3,830,791
PURIFICATION OF ENZYME INHIBITORS BY
AMPHOTERIC ION EXCHANGE RESINS
Christian Gölker, Wuppertal-Elberfeld, Germany, assignor to Farbenfabriken Bayer Aktiengesellschaft, Leverkusen, Germany
No Drawing. Filed Apr. 24, 1972, Ser. No. 246,929
Claims priority, application Germany, Apr. 24, 1971,
P 21 20 088.4
Int. Cl. C07c 103/52; C07g 7/00
U.S. Cl. 260—112.5                        7 Claims

ABSTRACT OF THE DISCLOSURE

The invention is directed to processes for the purification and/or enrichment of proteolytic or protease enzyme inhibitor mixtures. More particularly, the invention is concerned with separation of protease enzyme inhibitors from aqueous fluids by contacting said aqueous fluid containing said protease enzyme inhibitor with an amphoteric ion exchange resin to selectively adsorb the desired protease enzyme inhibitor, removing unadsorbed impurities by washing and subsequently eluting the protease enzyme inhibitor from said resin and recovering said protease enzyme inhibitor. Specifically, this invention is concerned with the recovery, in a relatively pure form, of a kallikrein-trypsin inhibitor (also known as kallikrein inactivator, KI) by contacting an impure solution containing the inhibitor with an amphoteric ion exchange resin so that the inhibitor is adsorbed thereon, separating the remaining solution and said amphoteric ion exchange resin from mutual contact and subsequently eluting said inhibitor from said amphoteric ion exchange resin.

FIELD OF THE INVENTION

The present invention relates to means for the purification of protease inhibitors, in general, and, in particular, to novel means for the purification of kallikrein-trypsin inhibitor (otherwise known as kallikrein inactivator) and especially to the isolation of kallikrein-trypsin inhibitor obtained from bovine organ tissue such as lungs and parotid glands.

DESCRIPTION OF THE PRIOR ART

The kallikrein-trypsin inhibitor from bovine organs ("Trasylol") is a basic polypeptide of molecular weight 6500, the chemical structure of which has been established. [F. A. Anderer and S. Hornle, Z. Naturforsch. pt. $b$-$20$ 457 (1965); F. A. Anderer, Z. Naturforsch. pt. $b.20$, 462 (1965); F. A. Anderer and S. Hornle, J. Biolog. Chem., 241 1568 (1965).] It inhibits various proteases, of which the most important are kallikrein, trypsin, chymotrypsin and plasmin. The inhibitor has found broad therapeutic use especially in the form of an injectable preparation [R. Gross and G. Kroneberg, "Neue Aspekte der Trasylol-Therapie" ("New Aspects of Trasylol Therapy"), published by F. K. Schattauer, Stuttgart 1965] in the treatment of acuate pancreatitis, in post-operative parotitis and prophylactically in upper abdominal surgery.

Because of its great importance medically, much effort has been devoted to develop means which will provide kallikreintrypsin inhibitor (also known as kallikrein-inactivator, KI) of very high purity for this purpose.

KI was first prepared by H. Kraut, E. K. Frey and E. Werle by extracting certain dried organs of mammals with water or dilute acetic acid and precipitating the inactivator from these extracts by the addition of ethanol.

Additional methods for the preparation of kallikrein-inactivator are known in the art which involve the isolation of the inactivator from the previously indicated source materials. In this respect there may be mentioned the method which is disclosed in U.S. Pat. No. 2,890,986. This process involves the extraction of animal organs with dilute acid aqueous ethanol, concentrating the extract in vacuo, extracting the concentrated extract to remove impurities from the aqueous phase, adding an organic solvent miscible with water to the aqueous phase to precipitate the kallikrein-inactivator, dissolving the recovered precipitate in dilute acetic acid, adjusting the solution obtained to a pH of 7.5 to 8.5 and removing the precipitated impurities therefrom. Following this latter removal step an organic solvent miscible with water is again added to precipitate the inactivator and the inactivator is then recovered as the dry powder.

Additional processes for the preparation of relatively pure solutions of kallikrein-inactivator are disclosed in U.S. Pat. No. 3,181,997. In respect to these known methods for preparing KI, there may also be mentioned the process for preparing the relatively pure KI through the use of metaphosphoric acid or its water-soluble salts to form a sparingly soluble precipitate following by treatment of the precipitate to obtain the readily water-soluble inactivator substance having a purity level of from about 0.16 to 0.19 $\mu$g./KIU.

More recently, additional processes for carrying out the fine purification of the kallikrein-trypsin inhibitor (KI) by column chromatography processes have been disclosed. These processes involve chromatography on diethylaminoethyl cellulose and carboxymethyl cellulose [Collection Czech. Chem. Commun., 30, 1705 (1965); C. R. Acad. Sc. Paris, 260, 3491 (1965)].

THE INVENTION

It has now been discovered that kallikrein-trypsin inhibitor (KI) can be strongly and selectively adsorbed onto amphoteric ion exchange resin based on polystyrene from impure solutions of polypeptides containing said kallikrein-trypsin inhibitor (KI), separating the amphoteric ion exchange resin from the remaining impure polypeptide solution and recovering the kallikrein-trypsin inhibitor from said amphoteric ion exchange resin by displacement chromatography.

The discovery that kallikrein-trypsin inhibitor could be bonded to an amphoteric ion exchange resin based on polystyrene is, indeed, surprising since kallikrein-trypsin inhibitor (KI), being a strongly basic polypeptide, would be expected to be bonded only by strong ion exchange resins having oppositely charged groups thereon. It is even more surprising and unexpected that the kallikrein-trypsin inhibitor would be strongly and selectively adsorbed onto amphoteric ion-exchange resins based on polystyrene while having no substantial adsorptive effect in regard to the impurities generally and normally occurring in kallikrein-trypsin inhibitor solutions.

The forementioned discoveries now provide means for the purification and enrichment of proteolytic enzyme inhibitor solutions such as kallikrein inhibitor solutions employing as source materials impure solutions of said proteolytic enzyme inhibitors by contacting them with amphoteric ion-exchange resins based on polystyrene.

The amphoteric ion-exchange resins based on polystyrene contemplated for use in the process of the invention are those amphoteric ion-exchange resins prepared from polymerizable monovinyl aromatic compounds such as styrene as starting materials and a minor proportion, for example, 0.1 to 15 weight percent of divinylbenzene to produce amphoteric ion-exchange resins based on polystyrene. Such methods of preparation are more fully described in U.S. Pat. No. 3,332,890. Additional amphoteric ion-exchange resins based on polystyrene suitable for use in the process of the invention include the homopolymers and copolymers of vinylphenyl aliphatic alpha- and beta-aminocarboxylic acids.

Specific examples of such polymerizable vinylphenyl aliphatic alpha- and beta-aminocarboxylic acids include:

N,N-bis(ar-vinylbenzyl)glycine
N-(ar-vinylbenzyl)sarcosine
N-(ar-vinylbenzyl)alanine
N,N-bis(ar-vinylbenzyl)alanine
N-(ar-vinylbenzyl)-β-alanine
N,N-bis(ar-vinylbenzyl)-β-alanine
N-(ar-vinylbenzyl)-2-aminobutyric acid
N-(ar-vinylbenzyl)-2-aminoisobutyric acid
N-(ar-vinylbenzyl)isovaline
N-(ar-vinylbenzyl)valine
N-(ar-vinylbenzyl)norvaline
N-(ar-vinylbenzyl)leucine
N-(ar-vinylbenzyl)isoleucine
N-(ar-vinylbenzyl)iminodiacetic acid
N-(ar-vinylbenzyl)-2-(vinylphenyl)glycine
N-carboxymethyl-N-(ar-vinylbenzyl)aspartic acid
2-(vinylphenyl)iminodiacetic acid
2-(vinylphenyl)nitrilotriacetic acid
N-(ar-vinylbenzyl)iminodiacetic acid
N-carboxymethyl-N-(ar-vinylbenzyl)alanine
N-carboxymethyl-N-(ar-vinylbenzyl)-β-alanine
N-carboxymethyl-N-(ar-vinylbenzyl)-2-aminobutyric acid
N-carboxymethyl-N-(ar-vinylbenzyl)-2-aminoisobutyric acid
N-carboxymethyl-N-(ar-vinylbenzyl)isovaline
N-carboxymethyl-N-(ar-vinylbenzyl)valine
N-carboxymethyl-N-(ar-vinylbenzyl)norvaline
N-carboxymethyl-N-(ar-vinylbenzyl)leucine
N-carboxymethyl-N-(ar-vinylbenzyl)isoleucine
N-(ar-vinylbenzyl)asparatic acid
N,N-bis(ar-vinylbenzyl)asparatic acid
N-(ar-vinylbenzyl)-3,3'-iminodipropionic acid
2-(vinylphenyl)glycine
3-(vinylphenyl)-β-alanine
3-(vinylphenyl)-3-aminobutyric acid
N-carboxymethyl-N-(ar-vinylbenzyl)-2-(vinylphenyl)glycine.

Such vinylphenyl aliphatic alpha- and beta-aminocarboxylic acids and suitable methods of preparing the same are described in U.S. Pat. No. 2,840,603. Likewise, the homopolymers and copolymers of the aforesaid vinylphenyl aliphatic aminocarboxylic acids and suitable methods for their preparation are described in U.S. Pat. No. 2,875,162.

Preferred amphoteric ion-exchange resins based on polystyrene are those in which aminoacetic acid groups and/or iminodiacetic acid groups have been introduced.

The process is generally carried out by charging an aqueous solution of the crude inhibitor onto a column which has been filled with amphoteric ion exchanger and equilibrated with phosphate buffer. Non-adsorbed material is removed by elution with phosphate buffer or salt solution. Thereafter, the inhibitor can be eluted using a salt solution of increasing concentration to give a series of fractions. The active fractions are combined and freed of salt in any suitable way; methods for this desalination are known in the art. Strongly colored impurities and the bulk of the foreign antigens are thus removed in a simple manner.

The elution of the kallikrein-trypsin inhibitor occurs at a sodium chloride concentration of 0.25 M, and is preferably carried out at pH values of 0.6 to 10.1, more preferably of 6.2 and 8.0, that is to say, under mild conditions which do not affect the inhibitor. The vicinity of basic and acid groups in the amphoteric ion exchanger hence has an advantageous effect on the capacity of the ion exchanger for bonding the active compound is surprising. This fact is probably attributable to the partly macroporous structure of the ion exchanger.

The invention is primarily but not exclusively directed to the purification of solutions of kallikrein-trypsin inhibitor. Accordingly, a preferred process of the invention is a process for the purification of kallikrein-trypsin inhibitor comprising:

(1) contacting an impure solution of the inhibitor with an amphoteric ion-exchange resin based on polystyrene, so that the inhibitor is adsorbed onto the resin;
(2) removing unadsorbed impurities from the resin by washing with a buffer or salt solution while leaving the inhibitor adsorbed thereon;
(3) eluting the inhibitor from the resin with a salt gradient to obtain a saline solution of the inhibitor;
(4) desalinating the said saline solution.

The process according to the invention makes it possible to prepare the kallikrein-trypsin inhibitor, the importance of which as a medicine is known, in a particularly pure form.

The following examples will serve to illustrate the practice of the invention.

EXAMPLE 1

The amphoteric ion exchanger resin was washed and charged with 1 N NaOH, distilled water, 0.5 N HCl and distilled water. It was then equilibrated with 0.01 M Na/K-phosphate buffer of pH 8.0. 100 ml. of the exchanger treated in this way were introduced into a column (2.5 x 20 cm.). The kallikrein-trypsin inhibitor, adsorbed on kieselguhr, and of a degree of purity of about 2,000 KIU/mg., was extracted with water. This solution was adjusted to a specific conductivity of 0.12 ms. x cm.$^{-1}$ by alternate addition of ion exchangers (H$^+$ and OH$^-$ form). 670 ml. of this solution, containing 5100 KIU/ml. (total activity: 3.4 x 10$^6$ KIU) were applied to the column at a speed of 1.15 ml./min./cm.$^2$. The column was washed with 0.01 M phosphate buffer and eluted with a linear gradient of 2 liters of 0.01 M phosphate buffer of pH 8.0 and 2 liters of 0.01 M phosphate buffer of pH 8.0+1.0 M NaCl, at a speed of 0.35 ml./min./cm.$^2$. The active fractions were combined and desalinated with ion exchangers, and the solution was lyophilized. The yield was 87% and the specific gravity 6030 KIU/mg.

EXAMPLE 2

The amphoteric ion exchanger was charged as described in Example 1 and equilibrated with 0.01 M Na/K-phosphate buffer of pH 6.2+0.001 M ethylenediaminetetraacetic acid (EDTA). 100 ml. of exchanger was introduced into a column (2.5 x 20 cm.). 20 ml. of a pre-purified inhibitor solution of activity 110,000 KIU/ml. (total activity: 2.2×10$^6$ KIU) and of purity 4000 KIU/mg. were charged onto the column at a speed of 0.35 ml./min./cm.$^2$. The column was washed with 0.01 M phosphate buffer and the active substance subsequently eluted with a linear gradient of 2 liters of 0.01 M phosphate buffer of pH 6.2+0.001 M EDTA and 2 liters of 0.01 M phosphate buffer of pH 6.2±0.001 M EDTA+1.0 M NaCl. The active fractions were combined and desalinated with ion exchangers, and the solution was lyophilized. The yield was 86% and the specific activity 5000 KIU/mg. The immunoelectropherogram shows one band in addition to an accompanying antigen, while the starting material shows a multiplicity of bands.

EXAMPLE 3

The amphoteric ion exchange resin was charged as described in Example 1 and equilibrated with 0.01 M Na/K-phosphate buffer of pH 8.0. 1300 ml. of a crude and still strongly colored inhibitor solution containing 7800 KIU/ml. (total activity: 10.1×10$^6$ KIU) and of a degree of purity of 2400 KIU/mg. were applied at a speed of 0.35 ml./min./cm.$^2$ to a column (2.5 x 20 cm.) containing 100 ml. of ion exchanger. After washing with 0.01 M phosphate buffer, elution was carried out with a linear gradient of NaCl in phosphate buffer. The active fractions were combined and desalinated with ion exchangers, and the solution was lyophilized. 1.58 g. of solid substance of specific activity 5500 KIU/mg. (total activity: $8.68 \times 10^6$ KIU) were obtained, corresponding to a yield of 86%. The product obtained was colorless and completely free of foreign antigens.

While the invention has been described with particularity with respect to the purification and enrichment of impure kallikrein-trypsin inhibitor solutions, it is manifest that it is applicable to the purification and enrichment of impure proteolytic enzyme inhibitor solutions and, accordingly, the invention is not to be limited except by the scope of the appended claims.

What is claimed is:

1. A process for the separation of kallikrein-trypsin inhibitor from a mixture, comprising contacting the mixture in aqueous solution with an amphoteric ion exchange resin based on polystyrene to adsorb the inhibitor on the resin and eluting the inhibitor from the resin.

2. The process of claim 1 in which the resin has aminoacetic acid groups.

3. The process of claim 1 in which the resin has iminodiacetic acid groups.

4. The process of claim 1 in which the inhibitor is eluted with an 0.25 M salt solution.

5. The process of claim 1 in which the inhibitor is eluted with a salt solution at a pH of 6.0–10.0.

6. The process of claim 5 in which the solution is at pH 6.2–8.0.

7. A process for the purification of kallikrein-trypsin inhibitor comprising:

(1) contacting an impure solution of the inhibitor with an amphoteric ion-exchange resin based on polystyrene, so that the inhibitor is adsorbed onto the resin;
(2) removing unadsorbed impurities from the resin by washing with a buffer or salt solution while leaving the inhibitor adsorbed thereon;
(3) eluting the inhibitor from the resin with a salt gradient to obtain a saline solution of the inhibitor;
(4) desalinating the said saline solution.

References Cited
UNITED STATES PATENTS

| | | | |
|---|---|---|---|
| 3,300,384 | 1/1967 | Schultz | 260—112.5 |
| 3,558,773 | 1/1971 | Schultz | 260—112.5 |
| 3,332,890 | 7/1967 | Hatch | 260—2.1 |

FOREIGN PATENTS

| | | | |
|---|---|---|---|
| 1,395,949 | 4/1964 | France | 260—112.5 |

OTHER REFERENCES

Dlouha et al.: Coll. Czech. Chem. Comm., *30*, 1705 (1965).

Sach et al.: Comptes Rendus Acad. Sci. Paris, *260*, 3491 (1965).

LEWIS GOTTS, Primary Examiner

R. J. SUYAT, Assistant Examiner

UNITED STATES PATENT OFFICE
CERTIFICATE OF CORRECTION

Patent No. 3830791  Dated August 20, 1974

Inventor(s) Christian Golker

It is certified that error appears in the above-identified patent and that said Letters Patent are hereby corrected as shown below:

Column 3, lines 33 and 34, "asparatic" should be --aspartic--.

Column 3, line 66, "0.6" should be --6.0--.

Column 3, line 70, after "effect on the" insert --elution behavior of the kallikrein-trypsin inhibitor. The high--.

Column 4, line 41, "gravity" should be --activity--.

Column 4, line 55 "±" should be --+--.

Signed and sealed this 31st day of December 1974.

(SEAL)
Attest:

McCOY M. GIBSON JR.
Attesting Officer

C. MARSHALL DANN
Commissioner of Patents